United States Patent [19]

Brannen et al.

[11] Patent Number: 5,607,282
[45] Date of Patent: Mar. 4, 1997

[54] DEPALLETIZING AND DISPENSING APPARATUS AND METHOD

[75] Inventors: John B. Brannen, Cheraw, S.C.; Salahuddin F. Khan, Cincinnati, Ohio

[73] Assignee: AIDCO Manufacturing, Inc.

[21] Appl. No.: 339,758

[22] Filed: Nov. 15, 1994

[51] Int. Cl.$^6$ ............................................. B65G 59/06
[52] U.S. Cl. ........................... 414/796.3; 414/797.6; 414/797.7; 414/929; 198/463.1
[58] Field of Search .................... 414/416, 796.3, 414/797.6, 797.7, 929; 198/374, 415, 462.1, 463.1

[56] References Cited

U.S. PATENT DOCUMENTS

| | | | |
|---|---|---|---|
| 3,038,615 | 6/1962 | Roth et al. | 414/929 |
| 3,069,050 | 12/1962 | Brettrager . | |
| 3,123,232 | 3/1964 | Postlewaite . | |
| 3,139,993 | 7/1964 | Lauer . | |
| 3,313,433 | 4/1967 | Hallenius . | |
| 3,342,349 | 9/1967 | Sheldon et al. | 414/929 |
| 3,653,525 | 4/1972 | Merkner et al. . | |
| 3,904,053 | 9/1975 | Yatagai et al. . | |
| 4,172,686 | 10/1979 | Shorthouse . | |
| 4,516,900 | 5/1985 | Avey . | |
| 4,582,464 | 4/1986 | Bossetti . | |
| 4,743,154 | 5/1988 | James et al. . | |
| 4,919,589 | 4/1990 | Krappitz et al. . | |
| 4,946,340 | 8/1990 | Murphy et al. . | |
| 4,979,870 | 12/1990 | Mojden et al. . | |
| 4,988,264 | 1/1991 | Winski . | |
| 5,032,053 | 7/1991 | Krieg . | |
| 5,135,351 | 8/1992 | Rathert . | |
| 5,180,277 | 1/1993 | Pearce et al. . | |
| 5,193,970 | 3/1993 | Chiappe et al. | 414/416 |
| 5,195,627 | 3/1993 | Wyman | 198/374 |
| 5,314,286 | 5/1994 | Bolejack et al. | 414/416 |

*Primary Examiner*—Karen B. Merritt
*Assistant Examiner*—Douglas Hess

[57] ABSTRACT

The depalletizing and dispensing apparatus and method is provided for unloading items stacked on a pallet. The apparatus includes a frame having a vertically reciprocable lift mounted at least partially within the frame. The lift has at least a pallet infeed position, a case dispensing position, and a pallet discharge position. The lift conveyor is located at least partially on the lift, and a device for securing the items stacked on the pallet also is provided. The securing device are located such that when the lift is at its pallet infeed position, the securing device can engage at least the lowermost layer of stacked items on the pallet, independent of the pallet. A pallet transport conveyor is located adjacent to the lift and arranged to receive and remove the pallet when the lift is in the pallet discharge position. A method is shown for providing and using the apparatus which includes setting the lift at its infeed position for receiving a loaded pallet, securing the stacked items independent of the pallet, discharging the pallet from the lift, and dispensing the stacked items from the lift.

27 Claims, 4 Drawing Sheets

DEPALLETIZING AND DISPENSING APPARATUS AND METHOD

TECHNICAL FIELD

This invention relates to a material handling apparatus for depalletizing and dispensing loaded pallets, and more particularly, to an improved depalletizer and dispenser for unloading and dispensing a plurality of palletized, stacked crates or cases, having a depalletizing station and an associated orientation conveyor which aligns the depalletized crates or cases for further processing.

BACKGROUND ART

In the absence of a depalletizing and dispensing apparatus for unloading stacked items from a pallet, it has been necessary for a laborer to manually remove stacked items such as packaged products, cases, crates or the like from the pallet. Dispensing of stacked items in this manner is inefficient, laborious, and expensive. In an attempt to remedy this problem, a number of unloading machines designed to depalletize loads or dispense a load of stacked pallets have been developed over the years. In this respect, depalletizers and unloaders which attempt to replace manual labor for preparing pallets, or items stacked thereon, for further processing and eventual reuse, are widely known in various forms.

For example, U.S. Pat. No. 3,139,993 to Lauer discloses a pallet unloader that removes stacked boxes from a pallet, and then sequentially removes each box from the bottom of the stack. The pallet and boxes are removed by an hydraulic ram which pushes the removed items onto a conveyor for further processing. U.S. Pat. No. 3,069,050 to Brettrager shows a pallet dispensing apparatus that removes the bottom pallet, sequentially, from a stack of pallets. The bottom pallet is separated from the pallet stack by a reciprocable carriage having tines that are inserted into the second pallet from the bottom to raise that pallet and those stacked on top of it. The carriage lifts the stack so that the bottom pallet remains alone on the roller bed, which in conjunction with a drive chain, sweeps the pallet away for further processing.

Unfortunately, depalletizers known in the prior art are themselves relatively expensive and difficult to adapt for unloading different types of loads. For example, the beverage industry recently began packaging beverage products in plastic (2 liter or 20 oz.) beverage containers. Consequently, plastic crates or cases were developed for accommodating a predetermined number (e.g. four) of plastic beverage containers at one time, and were designed to be stackable on pallets for loading multiple cases and multiple levels of such cases onto a single pallet. After the product is delivered, the empty cases are generally restacked on the pallets and returned to the plant for reuse. Heretofore, the returned cases had to be manually unloaded from the pallets because none of the existing unloading technology could be used, or adapted for use, with the plastic cases at an economical cost. Hence, there has been an unaddressed need for an affordable machine that is capable of automatically and adaptably depalletizing and dispensing palletized loads, especially with respect to cases of plastic beverage containers and the like.

SUMMARY OF THE INVENTION

It is an object of the present invention to obviate the above-described problems and shortcomings of depalletizing and dispensing machines and technology previously available in the industry.

It is yet another object of the present invention to provide an apparatus for receiving a loaded pallet of stacked items, automatically removing the pallet, and aligning the stacked items for further processing.

It is a further object of the present invention to provide an apparatus for depalletizing and dispensing a loaded pallet which is easily adaptable for use with various sized pallets and types of loads.

It is yet another object of the present invention to provide an automatic depalletizing and dispensing apparatus and process for automatically unloading individual items for further processing which includes a reciprocating clamping device for holding at least some of the stacked items during removal of the pallet.

In accordance with one aspect of the present invention, a combination depalletizer and dispenser for removing palletized loads of stacked items is provided which has a frame and a vertically reciprocable lift mounted at least partially within the frame. The lift has at least three predetermined height settings, a pallet infeed position, a case dispensing position, and a pallet discharge position. The upper surface area of the lift is less than the surface area of a pallet so that the pallet extends beyond the lift on at least two opposing sides. A lift conveyor is provided on top of the lift which also has a surface area that is less than the surface area of the pallet so that at least two opposing sides of the pallet extend beyond the corresponding opposite edges of the lift conveyor. Means for securing the stacked items are provided in conjunction with the frame such that, when the lift is at its pallet infeed position, the securing means can engage at least the lowermost layer of stacked items on the pallet without engaging the pallet. A chain type pallet transport conveyor is preferably located adjacent to the frame, with its active chains most advantageously disposed on either side of the lift at a discharge height which allows the pallet to rest on the chains when the lift is in its pallet discharge position. The lift then raises up until it supports the suspended cases at the lift's case dispensing position, where the securing means disengage the stack of cases. An orientation conveyor unit comprising a plurality of distinct, parallel conveyors which can be operated at different effective speeds is located adjacent to the lift and at a dispensing height such that, when the lift is in its case dispensing position, the stack of cases is transported from the lift to the orientation conveyor unit. In a preferred embodiment, an infeed conveyor is located adjacent the lift at an infeed height that allows a loaded pallet to be transported from the infeed conveyor onto the lift conveyor when the lift is in its pallet infeed position.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
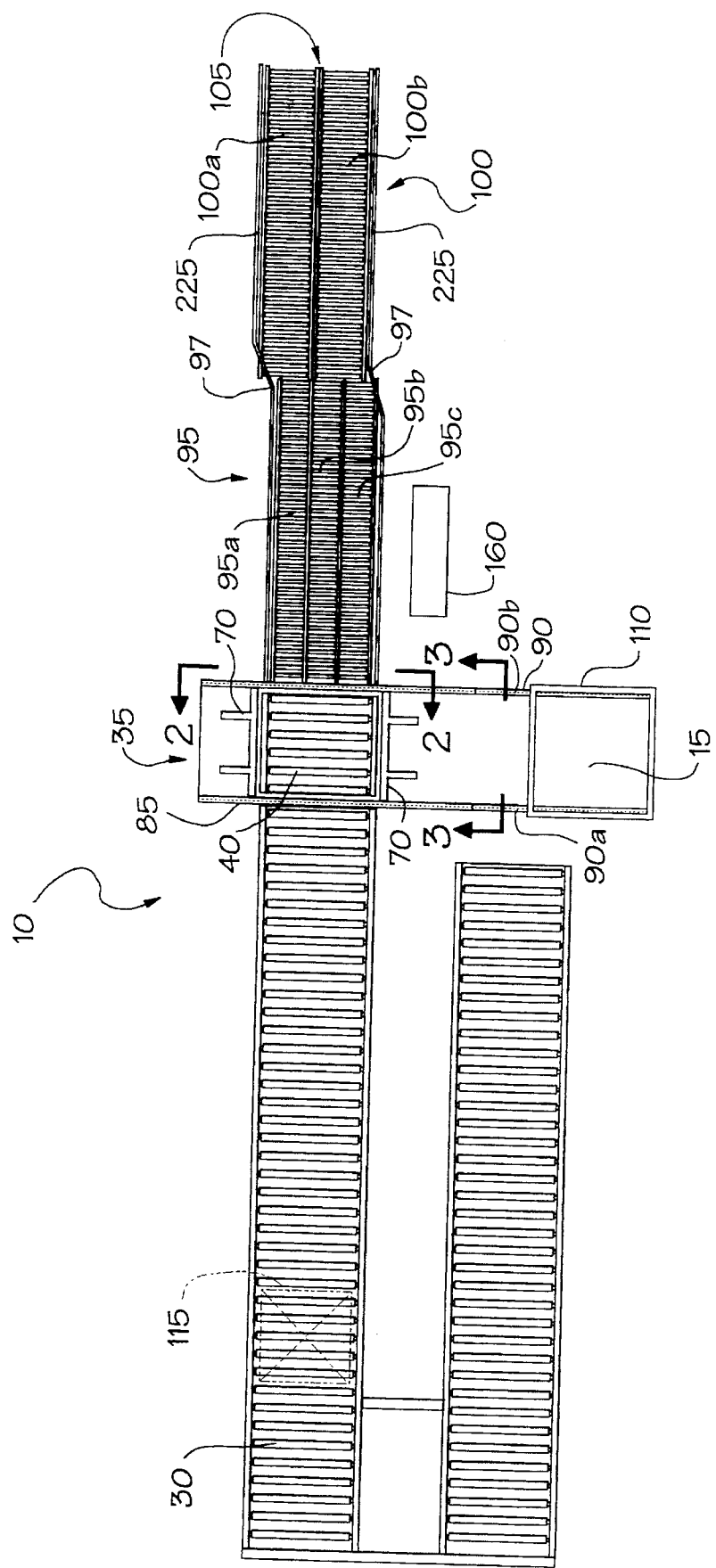
FIG. 1 is a top plan view of a preferred embodiment of a combination depalletizing and dispensing apparatus make in accordance with the present invention.

Referring now to the drawings in detail, wherein like numerals indicate the same elements throughout the view, FIG. 1 is a top plan view of a depalletizing and dispensing apparatus 10 made in accordance with the present invention. Particularly, depalletizing and dispensing apparatus 10 of the present invention can be designed for receiving a pallet 15 loaded with stacked items 20 (loaded pallet 115), such as the cases or crates mentioned above. (Although the apparatus 10 is designed for unloading stacked items from a pallet, it is possible to unload a single item that is stacked onto a pallet.) In an exemplary application, pallet 15 might be a relatively standard size (e.g. measuring approximately 36×42 inches (91.4 cm×106.7 cm)), and the stacked items 20 might include a number of adjacent columns (e.g. seven or eight 45 inch (114.3 cm) stacks) of empty beverage cases. Recently in the beverage industry, for example, such cases have relatively standardized sizes of either 12.5×18.75 inches (31.8×47.6 cm) or 9.5×19 inches (24.1×48.3 cm). Although this invention is particularly adaptable for this particular use, e.g. stacks of beverage cases, it is to be understood as only one example of a preferred embodiment of the invention. The apparatus may be adapted for use with different size pallets and loads and different types of loads.

The depalletizing and dispensing apparatus 10 is illustrated as comprising an infeed conveyor 30 which supports and transports the loaded pallet 115 to a case dispensing station 35. The larger (e.g. 42 inch (106.7 cm) dimension of the pallet is preferably aligned in the direction of infeed travel, shown by the direction arrow "I". The infeed conveyor 30 is designed to accommodate a plurality of loaded pallets 115 at one time so that a queue of such pallets is available for relatively continuous depalletizing and unloading operations. When one of the loaded pallets 115 is moved into position to enter the case dispensing station 35, the loaded pallet 115 is stopped and the infeed conveyor 30 closes an infeed conveyor interlock contact or similar position indicator (not shown), which signals the loaded pallet 115 is stopped and that a loaded pallet 115 is ready to enter the case dispensing station 35. At this time, the case dispensing station 35 similarly closes an enable infeed interlock relay contact or similar position indicator (not shown) which activates a lift conveyor 40 onto which the loaded pallet 115 is transferred. Alternatives to using relay contacts could include mechanical stops, position, dead zones where the conveyor stops automatically when the load reaches a certain point, a mechanical brake on the pallet, or the like. After the lift conveyor 40 draws the loaded pallet 115 off of the infeed conveyor 30 and into the case dispensing station 35, the infeed conveyor interlock contact relay is opened and cannot be closed until the enable infeed interlock contact relay is reopened. When the loaded pallet 115 is fully within the case dispensing station 35, the enable infeed interlock contact is opened and cannot be closed until the case dispensing station 35 cycle is complete. In this way, only one loaded pallet 115 can be released from the infeed conveyor, and the lift conveyor will only receive one pallet at a time.

Figure 2:
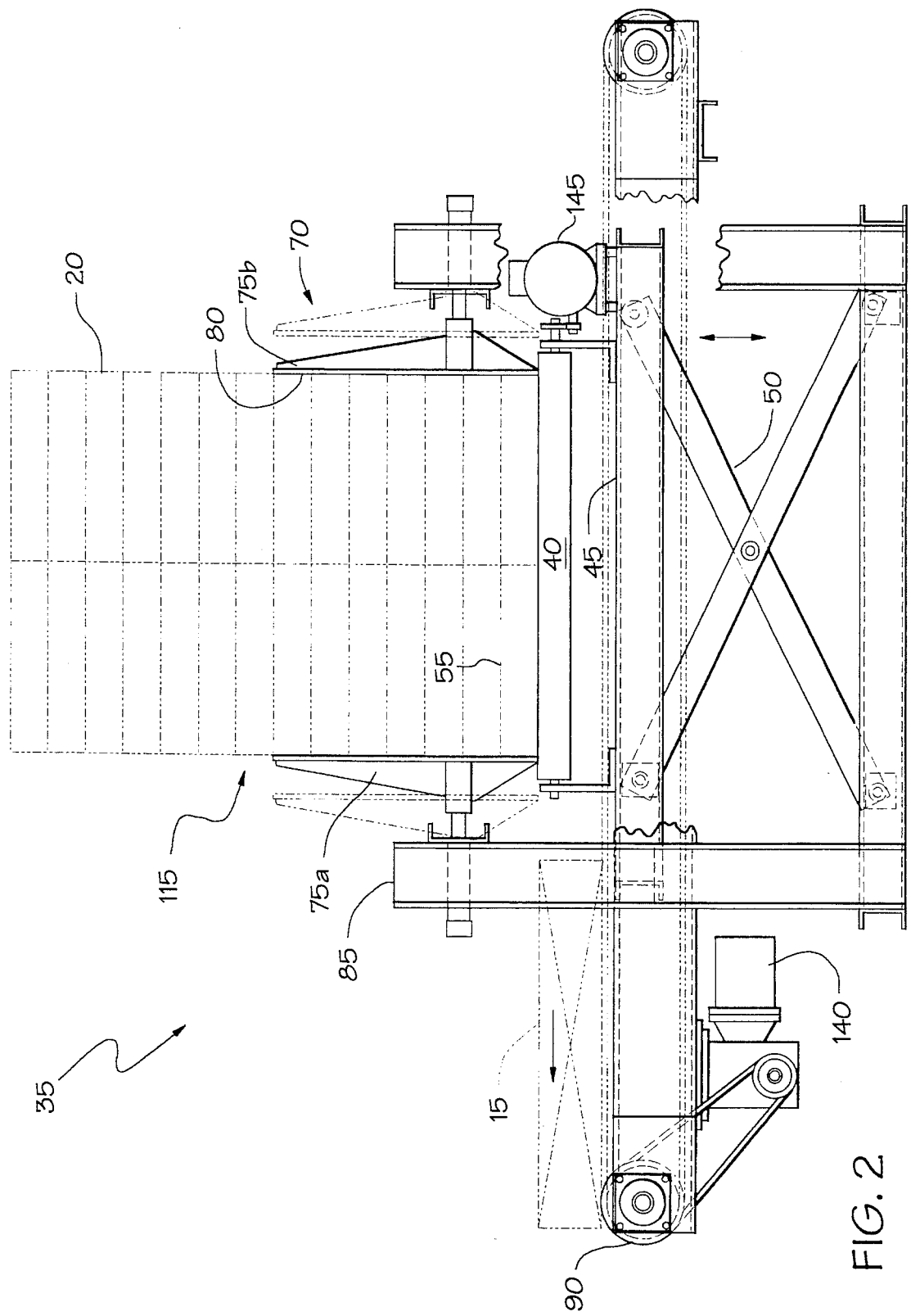
FIG. 2 is a partial front elevational view of the apparatus of FIG. 1 having a portion broken out to show otherwise hidden details, wherein a loaded pallet is shown on the lift which has been raised to its pallet infeed position and the cases are secured by the securing assembly.
Figure 3:
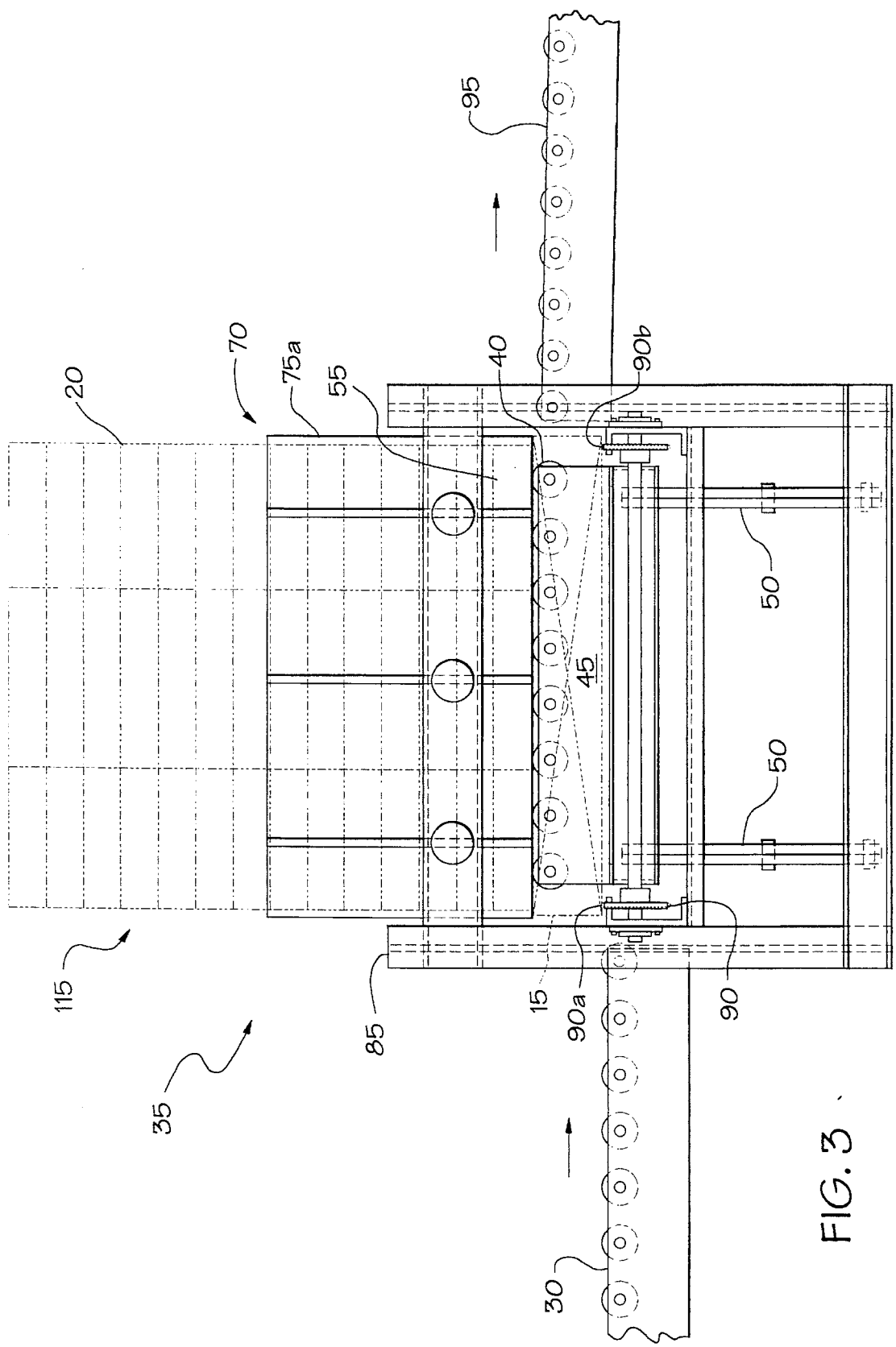
FIG. 3 is a partial, side elevational view of the apparatus of FIG. 1 as viewed from the left side.

Referring now to FIG. 2, which illustrates a preferred case dispensing station 35, triggering of the position indicator of the case dispensing station 35 activates the lift conveyor 40 to transfer the loaded pallet 115 into the case dispensing station 35. Although there are many suitable lift conveyors 40 that may be selected by one skilled in the art, the preferred lift conveyor 40 might be a segmented or belt type conveyor such as a 40×38 inch (101.6×96.5 cm) belt arrangement as available from Intralox and driven by a ⅓ horsepower (248.7 J/s) drive. Preferably, the lift conveyor 40 has at least two preset speeds, a first pallet infeeding speed (e.g. 20 ft/min (10.2 cm/s)), and a second case dispensing speed which might be slightly slower (e.g. 10 ft/min (5.1 cm/s)). The pallet infeeding speed is employed when the case dispensing station 35 position indicator is activated and the loaded pallet 115 is to be transferred into the station 35. The lift conveyor 40 is illustrated as being preferably located on top of a lift table 45 which is appropriately sized to accommodate the lift conveyor 40 and its drive mechanism. In the example discussed herein, the lift table 45 might be approximately 66×36 inches (167.6×91.4 cm). The lift table 45 also is preferably at least partially mounted within a frame 85 and is connected to a reciprocable scissor lift 50 or other mechanism for selectively raising and lowering the lift table 45. Frame 85 can be any sturdy foundation for supporting the apparatus, for example, channels may be welded in a rectangle with additional channel uprights welded at each corner.

The scissor lift 50 preferably employs a direct acting 5 inch (12.7 cm) bore by 10 inch (25.4 cm) stroke air cylinder or similar pneumatic arrangement for controlled reciprocation as desired. Proximity switch inputs or other limit control devices can be employed to stop and hold the lift 50 at one of a plurality of predetermined positions. For example, it is preferred that lift table 45 have at least three operating positions: a pallet infeed position, a case dispensing position, and a pallet discharge position. In order to enable removal of the pallet 15 from underneath the stacked cases 20, a securing means 70 is mounted on the frame 85, and is used to secure at least the lowermost case 55 and support the stacked cases 20 while the pallet 15 is removed. The securing means 70 preferably is a clamping means which includes two or more clamping plates (e.g. 75a, 75b) which also may include a pliant layer 80 of soft rubber or other resilient material for making the plates 75 at least partially deformable and facilitating their clamping function without damaging the cases 20. A suitable pliant layer 80 for use in an arrangement for beverage cases or the like has been determined to be a layer of approximately ½ inch (1.3 cm) thick, 10 durometer rubber.

The clamping plates 75 are mounted on the frame 85 at a position such that the plates 75 can be selectively activated to grip at least the lowermost case 55 of the stack 20 when the lift table 45 is at its pallet infeed position. The plates 75 preferably will secure the stack of cases 25 while the lift table 45, containing the empty pallet 15, is lowered by the scissor lift 50 to the lift's pallet discharge position. One or more of the clamping plates 75 may be reciprocally activated by appropriate means such as hydraulic, pneumatic, or mechanical devices, with pneumatic controls being preferred where pneumatics are also used for the scissor lift.

From the lift's pallet discharge position, the empty pallet 15 is removed from the lift table 45. The pallet 15 may be removed from the lift table 45 by any suitable means as selected by one skilled in the art such as by a conveyor, belts, a ram or kicker or a grabbing arm. As seen best in FIG. 2, a pallet transport conveyor 90 preferably comprises a chain conveyor which has a pair of chains 90a, 90b disposed on either side of the scissor lift 50, e.g., between the scissor lift 50 and the infeed conveyor 30 on one side (chain 90a), and between the scissor lift 50 and an orientation conveyor unit 95, on the other side (chain 90b). As will be understood, the chains 90a 90b are best located at a height which allows the pallet 15 to rest on the chains 90a, 90b when the lift table 45 is lowered to its pallet discharge position, but which do not interfere with the pallet infeed operations discussed above, as the chains remain sufficiently below the pallet infeed position. The surface area of the lift conveyor 40 and the lift table 45 should be less than the surface area of the pallet 15, such that the pallet 15 extends, on at least two sides, beyond the lift table 45 and lift conveyor 40. This allows the portions of the pallet 15 which extend beyond the lift table 45 and lift conveyor 40 to rest on the pallet transport conveyor 90 when the lift 50 is in its pallet discharge position. Pallet transport conveyor 90 moves the empty pallet 15 out from under the clamped stack of cases 20, preferably by employing an appropriate drive (140 on FIG. 4) that runs the chains 90, and, in a preferred arrangement, carries the empty pallet 15 to a pallet stacker 110 (see FIG. 1). A suitable pallet stacker 110 can comprise a scissor lift assembly (not shown) with a direct acting (e.g. 6 inch (15.2 cm ) bore by 10 inch (25.4 cm) stroke) air cylinder which can accept and stack a predetermined number of empty pallets.

Once the pallet 15 is removed, the scissor lift 50 can raise the lift table 45 to its case dispensing position, at which point the clamping plates 75 can be released and the stack of cases 20 will be supported on the lift table 45. The lift conveyor 40 is then activated to transport the stack of cases 20 out of the case dispensing station 35 at the lift conveyor's 40 case discharging speed (e.g. 10 ft/min (5.1 cm/s)) which may be slower than the pallet infeed speed so that consecutive case stacks 20 have time to separate from each other and do not get jammed as they are transferred to an adjacent orientation conveyor unit 95.

As shown in FIG. 1, the orientation conveyor unit 95 preferably includes a plurality of orientation conveyors (e.g. conveyors 95a, 95b, 95c) which are aligned in a parallel arrangement and may operate at distinct speeds. In an exemplary embodiment for beverage cases or the like, each of the conveyors 95a, 95b and 95c might comprise a 13 inch wide (33 cm), 10 feet (304.8 cm) long flat roller conveyor having 1⅜ inch (3.5 cm) diameter rollers spaced on 1¾ inch (4.4 cm) centers. As mentioned, the orientation conveyors 95a, 95b, 95c might preferably operate at different speeds. For example, orientation conveyor 95a might be operated at 45 ft/min. (22.9 cm/s), while orientation conveyor 95b runs at 35 ft/min (17.8 cm/s) and orientation conveyor 95c runs at 25 ft/min (12.7 cm/s). Operating the conveyors at different speeds enables the case stacks 20, which usually are riding on more than one of the orientation conveyors 95 at the same time, to be rotated into proper alignment for entering an accumulation conveyor unit 100. Operation of the orientation conveyors 95 at distinct speeds also allows the case stacks to be appropriately spaced apart from each other for further processing. As should be understood, when a case stack 20 is in contact with more than one conveyor or unit 95, the faster conveyor pulls the end of the case stack 20 with which it is in contact, ahead of the slower conveyor which causes the case stack to rotate around its center of gravity. The individual conveyor speeds can be widely variable from 10–200% of the aboveidentified speeds, and the orientation conveyor 95c preferably has angled railings 97 for guiding the case stacks 20 toward the accumulation conveyor unit 100.

The accumulation conveyor unit 100 is illustrated as including two parallel accumulation conveyors 100a, 100b which preferably have a gap 105 therebetween. The accumulation conveyor unit 100 immediately follows and is adjacent the orientation conveyor unit 95; however, the longitudinal axis of the accumulation conveyor unit 100 is partially offset from the longitudinal axis of the orientation conveyor unit 95 such that the gap 105 is aligned between the orientation conveyors 95a and 95b. In an exemplary embodiment, each of the accumulation conveyors 100a, 100b is a 19 inches (48.3 era) wide and 10 feet (304.8 cm) long flat roller conveyor having 1⅜ inches (3.5 cm) diameter rollers spaced on centers measuring 1¾ inches (4.4 era). The rollers of the accumulation conveyor unit 100 are preferably angled for directing the case stacks 20 to the outside guide rails 225 so that the case stacks are properly aligned for further processing by a denester (not shown). This preferred configuration of conveyors has been determined to be the preferred method of positioning the case stacks 20 for further processing such as entry into a denester (not shown) for dispensing of the individual cases. For example, if multiple case stacks are stuck together when they enter the accumulation conveyor unit 100, the gap 105 and angled rollers helps to separate the case stacks 20 by pulling them toward opposite outside edges.

ELECTRICAL LAYOUT

Figure 4:
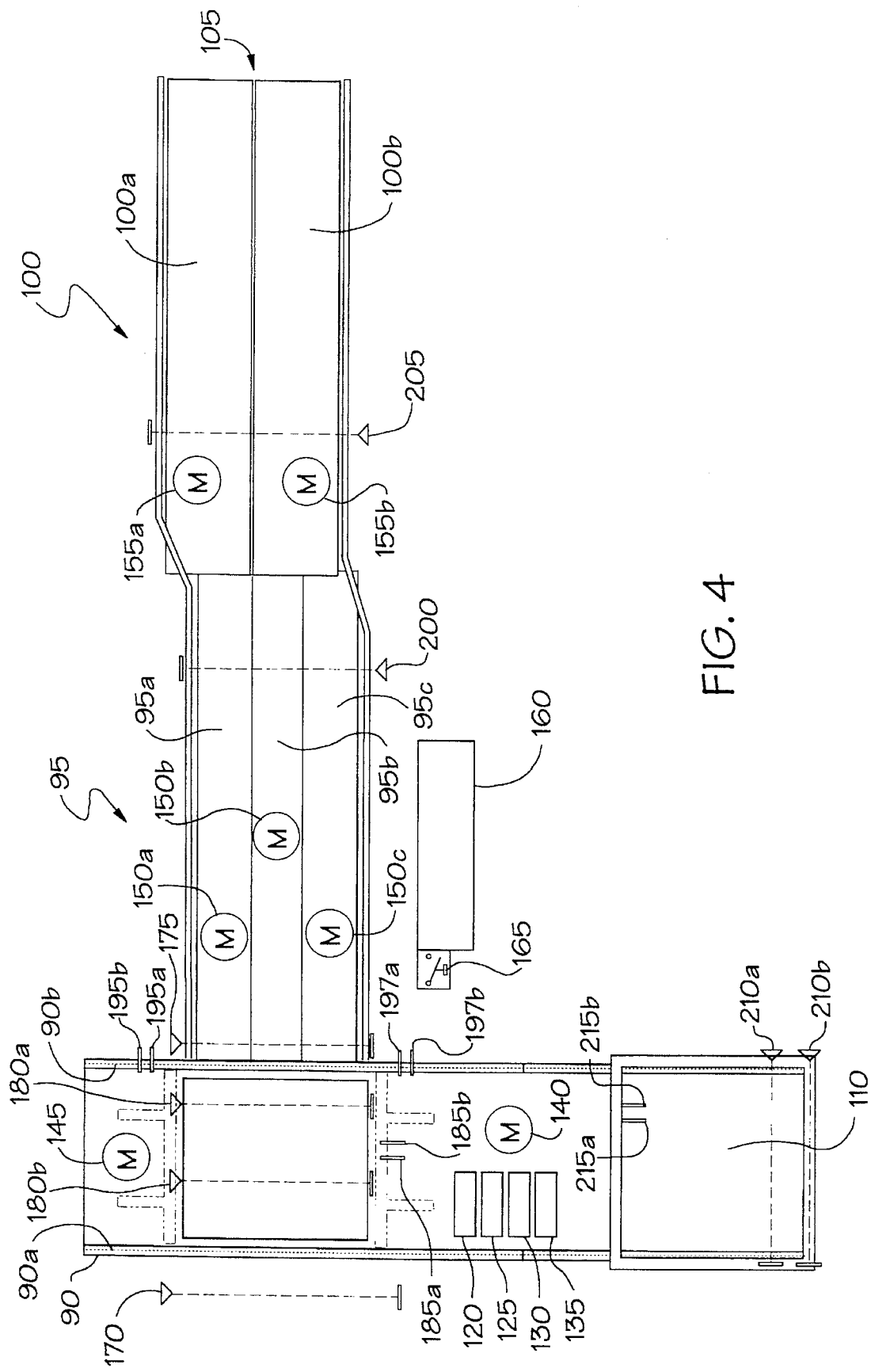
FIG. 4 is a schematic diagram illustrating exemplary electrical circuitry of the apparatus of FIG. 1.

A touch screen type interface (not shown) is preferably used to set the apparatus 10 in manual or automatic mode. Preferably, the interface selected should allow the machine to be operated and monitored during both manual and automatic operation, respectively. A suitable interface might be the Allen-Bradley PANELVIEW™ 550 or the like. As shown in FIG. 4, the apparatus 10 employs four control valves 120, 125, 130, 135, each of which might be a 3-position, blocked center, double solenoid valve or the like. An alternative, but not preferred method of controlling the reciprocal motion of the apparatus 10 is to employ, for example, an electric gear motor. However, use of solenoid valves has been found to be the most dependable control method. Valve 120 is a fast solenoid which raises and lowers the lift table quickly between its pallet discharge and case dispensing positions, whereas solenoid valve 125 raises the lift table slowly. Solenoid valve 130 extends and returns the clamping plates 75, and solenoid valve 135 raises and lowers the pallet stacker 110. Ideally, each valve has a Cv factor of 0.7 and is manifold mounted with a flow control adjustment for each port.

Each conveyor preferably is driven by an independent motor as follows: the infeed conveyor 30 is run by an infeed conveyor motor 140, the lift conveyor 40 is driven by a lift conveyor motor 145, the orientation conveyors 95a, 95b, 95c are run by orientation conveyor motors 150a, 150b, 150c respectively, and the accumulation conveyors 100a, 100b are run by accumulation conveyor motors 155a, 155b. A main electrical enclosure 160 contains a main air pressure switch for operating the previously described air cylinders as appropriate. Several position sensors are used as position indicators for activating proximity switches such as pallet infeed sensor 170, which is located adjacent the case dispensing station 35. The position sensors may be photoelectric eyes, contact relays, or the like. Likewise, a position sensor 175 is located just outside of the case dispensing station 35 for sensing when the case stacks 20 have fully exited the case dispensing station 35. Position sensors or other position monitoring devices 180a, 180b are located so as to determine the position of the lift table 45 and to appropriately trigger lift table proximity switches 185a, 185b. Proximity switches 190a/b control pallet infeed onto the lift table 45. Movement of the clamping plates 75a, 75b is controlled by proximity switches 195a, 195b. A programmable controller is used to monitor all field devices such as the position sensors, proximity switches, relays, solenoid valves, motor starters, variable frequency drives, and the operator interface. A preferred controller is a small programmable controller such as an AB SLC-503 which works well in conjunction with the exemplary interface.

MODE OF OPERATION

FIGS. 1 and 4 best illustrate the mode of operation of the invention. Operation of the depalletizing and dispensing apparatus 10 requires setting the lift table 45 in its infeed position. When loaded pallets 115 are placed on the infeed conveyor 30, they are transported in direction (I) towards the lift table 45. The infeed conveyor interlock signals when a loaded pallet 115 is in position to enter the case dispensing station 35, such that the lift conveyor 40 is activated, and the enable infeed interlock contact is energized. The loaded pallet 115 is transported by the lift conveyor 40 past the infeed sensor 170 and into the case dispensing station 35. Once the loaded pallet 115 is fully on the lift table 45, the lift conveyor 40 stops operating. The infeed conveyor 30 stops running when the next loaded pallet 115 is in position to enter the case dispensing station 35. After the lift conveyor 40 stops advancing, the clamping means 70 is activated, and clamping plates 75a, 75b engage at least the lowermost case 55 without securing the pallet 15. When the clamping plates 75a, 75b are fully closed, the lift table 45 lowers to its pallet discharge position, which activates the pallet transport conveyor 90. The pallet transport conveyor 90 carries the empty pallet 15 to the pallet stacker 110. Once the pallet 15 is detected at the pallet stacker 110, the lift table 45 raises to its case dispensing position, which causes the clamping plates 75a, 75b to open, allowing the case stacks 20 to rest on the lift table 45. After the clamping plates 75a, 75b are fully opened, the lift conveyor 40 starts and transfers the case stacks 20 to the orientation conveyor unit 95. Once the case stacks 20 have cleared the case exit sensor 175, the lift table 45 descends to its pallet infeed position, in order to repeat this cycle. The orientation conveyors 95a, 95b, 95c properly orient the case stacks 20 for entering the accumulation conveyor unit 100. On the accumulation conveyor unit 100, the case stacks 20 are directed toward the outer guiderails 225 of the accumulation conveyor unit 100 by angled rollers, which assures that the case stacks 20 will be guided smoothly to the denester (not shown) for dispensing of the individual cases from each stack.

Having shown and described the preferred embodiments of the present invention, further adaptions of the depalletizing and dispensing apparatus shown and described herein can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specifications and drawings.

We claim:

1. A combination depalletizer and dispenser for loads of items stacked on a pallet, comprising:

a frame;

a vertically reciprocable lift mounted at least partially within said frame, said lift having at least a pallet infeed position, a case dispensing position, and a pallet discharge position, each of said positions having a different predetermined height setting;

a lift conveyor located at least partially on said lift;

means for securing said stacked items independent of said pallet, said securing means engaging at least the lowermost layer of stacked items on said pallet when said lift is at its pallet infeed position; and a pallet transport conveyor located adjacent said lift and arranged to receive and remove the pallet when said lift is in the pallet discharge position.

2. The depalletizer and dispenser of claim 1, wherein said securing means comprises at least one clamping device.

3. The depalletizer and dispenser of claim 1, wherein said transport conveyor is located below said pallet infeed position.

4. The depalletizer and dispenser of claim 1, wherein said securing means is disposed on said frame above said pallet infeed position and said case dispensing position being located above said pallet infeed position.

5. The depalletizer and dispenser of claim 1, wherein said pallet discharge position is below said pallet infeed position.

6. The depalletizer and dispenser of claim 1, further comprising an infeed conveyor disposed adjacent said lift and at a height such that when said lift is in its pallet infeed position, a loaded pallet may be transported from said infeed conveyor onto said lift conveyor.

7. The depalletizer and dispenser of claim 1, further comprising an orientation conveyor unit located adjacent said lift such that when said lift is in its case dispensing position, said stacked items may be dispensed from said lift to said orientation conveyor unit.

8. The depalletizer and dispenser of claim 7, wherein said orientation conveyor unit includes a plurality of distinct orientation conveyors, said distinct orientation conveyors being aligned in parallel relation and each said distinct conveyor being operated at a distinct rate of speed.

9. The depalletizer and dispenser of claim 7, further comprising an accumulation conveyor unit located axially forward of and adjacent to said orientation conveyor unit.

10. The depalletizer and dispenser of claim 9, wherein said accumulation conveyor unit includes a plurality of distinct accumulation conveyors, said distinct accumulation conveyors being aligned in parallel relation.

11. The depalletizer and dispenser of claim 1, wherein said pallet transport conveyor comprises a chain conveyor.

12. The depalletizer and dispenser of claim 1, wherein said pallet is removed from said lift while said stacked items are secured.

13. A combination depalletizer and dispenser for loads of items stacked on a pallet, comprising:

a frame;

a vertically reciprocable lift mounted at least partially within said frame, said lift having at least a pallet infeed position, a case dispensing position, and a pallet discharge position, and an upper surface area that is less than the surface area of a pallet to be loaded such that a portion of said pallet extends beyond said lift on at least two opposing sides;

a lift conveyor located at least partially on said lift for simultaneously transporting all layers of stacked items clear of said lift within said lift as at said case dispensing position, said lift conveyor also having a surface area that is less than the surface area of said pallet such that said pallet extends beyond said lift conveyor on at least two opposing sides;

means for securing said stacked items independent of said pallet, said securing means engaging at least the lowermost layer of stacked items on said pallet when said lift is at its pallet infeed position such that said pallet maybe removed from said lift while said stacked items are secured; and a pallet transport conveyor located adjacent said lift and arranged to receive and remove the pallet when said lift is in the pallet discharge position, said pallet transport conveyor removing said pallet from said lift by engaging at least part of said extended portion of said pallet on each of the at least two opposing sides.

14. The depalletizer and dispenser of claim 13, wherein each of said positions have a different predetermined height setting.

15. The depalletizer and dispenser of claim 13, wherein said securing means is disposed on said frame above said pallet infeed position and said case dispensing position being located above said pallet infeed position.

16. The depalletizer and dispenser of claim 13, further comprising an infeed conveyor disposed adjacent said lift and at a height such that when said lift is in its pallet infeed position, a loaded pallet may be transported from said infeed conveyor onto said lift conveyor.

17. The depalletizer and dispenser of claim 13, further comprising an orientation conveyor unit located adjacent said lift such that when said lift is in its case dispensing position, said stacked items may be dispensed from said lift to said orientation conveyor unit.

18. The depalletizer and dispenser of claim 17, further comprising an accumulation conveyor unit located axially forward of and adjacent to said orientation conveyor unit.

19. The depalletizer and dispenser of claim 13, wherein said pallet transport conveyor comprises a chain conveyor.

20. A method for depalletizing and dispensing loads of items stacked on a pallet, comprising the steps of:

providing a combination depalletizing and dispensing apparatus, said apparatus having a frame, a vertically reciprocable lift having a pallet infeed position, a case dispensing position, and a pallet discharge position, each of said positions having a different predetermined height setting, a lift conveyor located at least partially on said lift, means for securing said stacked items independent of said pallet, and a pallet transport conveyor located adjacent said lift;

setting said lift at said infeed position for receiving a pallet loaded with items stacked thereon;

securing said load of items stacked on said pallet, independent of said pallet;

discharging said pallet from said lift; and dispensing said stacked items from said lift.

21. The method of claim 20, further comprising the step of moving said lift to said case dispensing position and supporting said items on an upper surface of said lift after said pallet is removed.

22. The method of claim 20, further comprising the step of moving said lift to said pallet discharge position after securing said stacked items independently from said pallet.

23. A combination depalletizer and dispenser for loads of items stacked on a pallet, comprising:

a frame;

a vertically reciprocable lift mounted at least partially within said frame, said lift having at least a pallet infeed position, a case dispensing position, and a pallet discharge position, and an upper surface area that is less than the surface area of a pallet to be loaded such that a portion of said pallet extends beyond said lift on at least two opposing sides;

a lift conveyor located at least partially on said lift for simultaneously moving all layers of stacked items clear of said lift when said lift is at said case dispensing position, said lift conveyor also having a surface area that is less than the surface area of said pallet such that said pallet extends beyond said lift conveyor on at least two opposing sides;

two clamping plates mounted on said frame for securing said stacked items independent of said pallet, said plates being oppositely disposed and facing each other and located such that when said lift is at its pallet infeed position, said clamping plates can be moved toward each other to grip at least the lowermost layer of stacked items on said pallet therebetween; and a pallet transport conveyor located adjacent said lift and arranged to receive and remove the pallet when said lift is in the pallet discharge position, said pallet transport conveyor removing said pallet from said lift by engaging at least part of said extended portion of said pallet on each of the at least two opposing sides.

24. A combination depalletizer and dispenser for loads of items stacked on a pallet, comprising:

a frame;

a vertically reciprocable lift mounted at least partially within said frame, said lift having at least a pallet infeed position, a case dispensing position, and a pallet discharge position, each of said positions having a different predetermined height setting;

a lift conveyor located at least partially on said lift;

at least one clamping device for securing said stacked items independent of said pallet, said clamping device comprising two clamping plates mounted on the frame and substantially oppositely disposed and facing each other, and being located such that when said lift is at its pallet infeed position, said plates can move toward each other to grip at least the lowermost layer of stacked items on said pallet therebetween; and a pallet transport conveyor located adjacent said lift and arranged to receive and remove said pallet when said lift is in the pallet discharge position.

25. The depalletizer and dispenser of claim 24, wherein said clamping plates are at least partially deformable.

26. A combination depalletizer and dispense for loads of items stacked on a pallet, comprising:

a frame;

a vertically reciprocable lift mounted at least partially within said frame, said lift having at least a pallet infeed position, a case dispensing position, and a pallet discharge position, each of said positions having a different predetermined height setting, and an upper surface area that is less than the surface area of a pallet to be loaded such that said pallet extends beyond said lift on at least two opposing sides;

a lift conveyor located at least partially on said lift for simultaneously transporting all layers of stacked items clear of said lift within said lift as at said case dispensing position, said lift conveyor also having a surface area that is less than the surface area of said pallet such that a portion of said pallet extends beyond said lift conveyor on at least two opposing sides;

means for securing said stacked items independent of said pallet, said securing means engaging at least the lowermost layer of stacked items on said pallet when said lift is at its pallet infeed position such that said pallet may be removed from said lift while said stacked items are secured;

a pallet transport conveyor located adjacent said lift and arranged to receive and remove the pallet when said lift is in the pallet discharge position; and an orientation conveyor unit distinct from said pallet transport conveyor and located adjacent said lift such that when said lift is in its case dispensing position, said stacked items may be dispensed from said lift to said orientation conveyor unit.

27. The combination depalletizer and dispenser of claim 26, wherein said pallet transport conveyor removes said pallet from said lift by engaging at least part of said extended portion of said pallet on each of said at least two opposing sides.

* * * * *